(12) United States Patent
Li et al.

(10) Patent No.: US 10,845,906 B2
(45) Date of Patent: Nov. 24, 2020

(54) TOUCH MEMBER AND DISPLAY

(71) Applicant: YUNGU (GU'AN) TECHNOLOGY CO., LTD., Hebei (CN)

(72) Inventors: Weiguo Li, Hebei (CN); Hui Zhu, Hebei (CN); Xiaobao Zhang, Hebei (CN)

(73) Assignee: YUNGU (GU'AN) TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 16/316,760

(22) PCT Filed: Dec. 22, 2017

(86) PCT No.: PCT/CN2017/118032
§ 371 (c)(1),
(2) Date: Jan. 10, 2019

(87) PCT Pub. No.: WO2018/121441
PCT Pub. Date: Jul. 5, 2018

(65) Prior Publication Data
US 2019/0235681 A1    Aug. 1, 2019

(30) Foreign Application Priority Data

Dec. 26, 2016   (CN) .................. 2016 2 1438772 U

(51) Int. Cl.
*G06F 3/044*    (2006.01)
*G06F 3/041*    (2006.01)

(52) U.S. Cl.
CPC ............ *G06F 3/0412* (2013.01); *G06F 3/041* (2013.01); *G06F 3/044* (2013.01); *G06F 2203/04102* (2013.01); *G06F 2203/04104* (2013.01)

(58) Field of Classification Search
CPC ........ G06F 3/0412; G06F 3/041; G06F 3/044; G06F 2203/04102; G06F 2203/04104; G06F 2203/04112
See application file for complete search history.

(56) References Cited

U.S. PATENT DOCUMENTS

2009/0085891 A1*  4/2009  Yang ................. G06F 3/044
                                                         345/174
2010/0026663 A1*  2/2010  Iwasaki ............ G02F 1/13338
                                                         345/174
(Continued)

FOREIGN PATENT DOCUMENTS

CN       104881161 A      9/2015
CN       105511705 A      4/2016
(Continued)

*Primary Examiner* — Lunyi Lao
*Assistant Examiner* — Jarurat Suteerawongsa
(74) *Attorney, Agent, or Firm* — Muncy, Geissler, Olds & Lowe, P.C.

(57) ABSTRACT

A touch member and a display are provided. The touch member includes: a first substrate (100), a number of touch electrodes, and a number of signal lines. The first substrate includes at least one bendable bending area. The touch electrodes are disposed on at least one surface of the first substrate (100). At least some of the touch electrodes are separated into a number of disconnected touch sub-electrodes by the bending region. And each of the touch sub-electrodes is driven by a signal line.

8 Claims, 3 Drawing Sheets

(56) References Cited

U.S. PATENT DOCUMENTS

| | | | | |
|---|---|---|---|---|
| 2014/0098095 A1* | 4/2014 | Lee | ............... | G06F 3/041 |
| | | | | 345/420 |
| 2014/0139447 A1* | 5/2014 | Kang | ............... | G06F 3/044 |
| | | | | 345/173 |
| 2015/0242022 A1* | 8/2015 | Hung | ............... | G06F 1/1615 |
| | | | | 345/174 |
| 2015/0324046 A1 | 11/2015 | Lo et al. | | |
| 2016/0188098 A1* | 6/2016 | Her | ............... | G06F 1/1652 |
| | | | | 345/173 |
| 2016/0291780 A1* | 10/2016 | Namkung | ............... | G06F 3/0412 |
| 2017/0131809 A1* | 5/2017 | Lin | ............... | G06F 1/1652 |

FOREIGN PATENT DOCUMENTS

| | | |
|---|---|---|
| CN | 205507727 U | 8/2016 |
| CN | 206322135 U | 7/2017 |
| JP | 2010211348 A | 9/2010 |
| KR | 20160026069 A | 3/2016 |

\* cited by examiner

TOUCH MEMBER AND DISPLAY

TECHNICAL FIELD

The present application relates to the field of display technology and, in particular, to a touch member and a display comprising the touch member.

BACKGROUND

A display device provides information to a user by displaying various images on its screen. Foldable display devices with flexible displays have been developed. Such a display device may include a foldable touch member that can sense a touch event and provide the display device with coordinate information of the position where the touch event took place. The display device may then display images corresponding to the information provided by the touch member.

In recent years, flexible display devices have received extensive attention due to their bendable and foldable nature. Moreover, the market demand for flexible display devices employing touch members has been rising, requiring the touch members to have good bending and folding resistance.

SUMMARY

It is an object of the present application to provide a touch member and a display device with resistance to, and capabilities of touch control during, bending and folding.

To solve the above technical problem, the present application provides a touch member, comprising:

a first substrate comprising at least one bendable bending region; and a plurality of touch electrodes disposed on at least one surface of the first substrate, wherein at least a part of the plurality of touch electrodes are separated into a plurality of disconnected touch sub-electrodes by the bending region, and each of the touch sub-electrodes is driven by a signal line.

Additionally, in the touch member, the plurality of touch electrodes comprise a plurality of first touch electrodes and a plurality of second touch electrodes, the plurality of first touch electrodes extending along a first direction, the plurality of second touch electrodes extending along a second direction.

Additionally, in the touch member, the bending region comprises n first-directional bending regions extending along the first direction, wherein at least one of the second touch electrodes are separated into (n+1) disconnected second touch sub-electrodes by the first-directional bending region, each of the second touch sub-electrodes is driven by a signal line, and n is a positive integer.

Additionally, in the touch member, each of the first-directional bending regions is located between adjacent first touch electrodes, and wherein different first-directional bending regions are respectively located between different adjacent first touch electrodes.

Additionally, in the touch member, the bending region further comprises m second-directional bending regions extending along the second direction, wherein at least one of the first touch electrodes are separated into (m+1) disconnected first touch sub-electrodes by the second-directional bending region, each of the first touch sub-electrodes is driven by a signal line, and m is a positive integer.

Additionally, in the touch member, each of the second-directional bending regions is located between adjacent second touch electrodes, and wherein different second-directional bending regions are respectively located between different adjacent second touch electrodes.

Additionally, in the touch member, the first touch electrodes and the second touch electrodes are strip-shaped. Alternatively, each of the first touch electrodes comprises a plurality of first rhombic electrodes and a first connection line which electrically connects the plurality of first rhombic electrodes along the first direction, and each of the second touch electrodes comprises a plurality of second rhombic electrodes and a second connection line which electrically connects the a plurality of second rhombic electrodes along the second direction.

Additionally, in the touch member, the bendable region has a width of 1 µm to 10 µm.

According to another aspect of this application, it is provided a display device comprising the touch member as defined above.

Additionally, the display device may further comprise a flexible circuit board (FPC), and different signal lines connected to a same touch electrode are electrically connected by the flexible circuit board.

Additionally, in the display device, for each of the touch electrodes, the FPC provides a same sensing signal to each of the touch sub-electrodes of the same touch electrode.

The above touch member and display device offer the following advantages:

In the above touch member and display device, the touch member includes a first substrate, touch electrodes and a plurality of signal lines. The first substrate includes at least one bendable bending region, and the touch electrodes are disposed on at least one surface of the first substrate. At least some the touch electrodes are separated into a plurality of disconnected touch sub-electrodes by the bending region. Each of the touch sub-electrodes is driven by a signal line. The disconnected touch electrodes in the bending region ensure good bending properties of the touch member and the display device at the bending region. Moreover, driving each of the touch sub-electrodes by a respective signal line ensures each of the touch sub-electrodes to be normally driven and allows normal touch control at each of the touch control positions of the display device in a bending situation.

DETAILED DESCRIPTION

Figure 1:
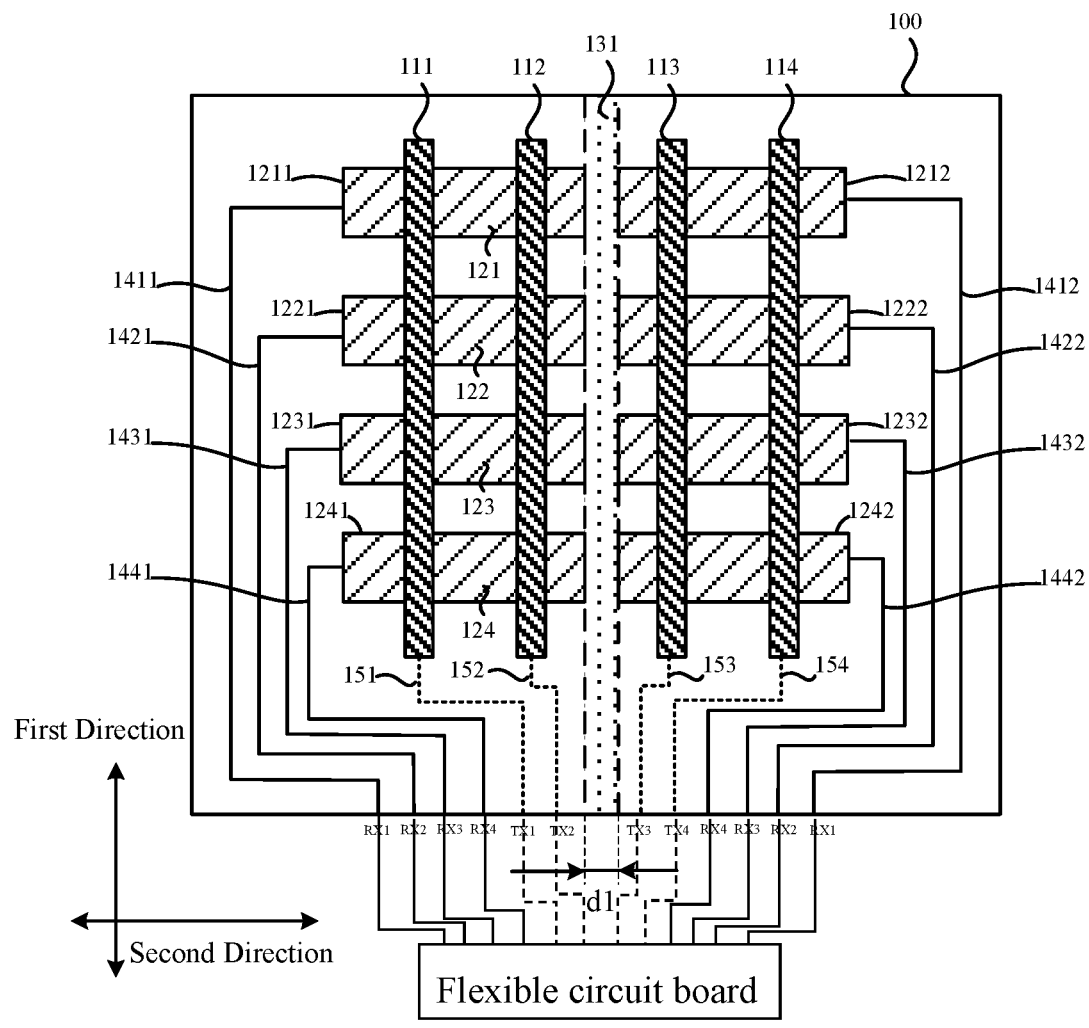
FIG. 1 is a schematic view of a touch member according to embodiment 1.

The touch member and display device proposed in the present application will be described in greater detail below with reference to the accompanying schematics, which present preferred embodiments of the application. It is to be appreciated that those skilled in the art can make changes to the application disclosed herein while still obtaining the beneficial results thereof. Therefore, the following description shall be construed as being intended to be widely known by those skilled in the art rather than as limiting the application.

For simplicity and clarity of illustration, not all features of the disclosed specific embodiment are described. Additionally, description and details of well-known functions and structures are omitted to avoid unnecessary obscureness of the application. The development of any practical embodiment of the present application must include many implementation details to achieve the developer's specific goals, such as compliance with system-related and business-related constraints, which will vary from one implementation to another. Moreover, such a development might be complex and time-consuming but would nevertheless be a routine work for those of ordinary skilled in the art.

The present application will be described in the following paragraphs by way of examples with reference to the accompanying drawings. Features and advantages of the application will be more apparent from the following detailed description and claims. Note that the accompanying drawings are provided in a very simplified form not necessarily presented to scale, with the only intention of facilitating convenience and clarity in explaining a few illustrative examples of the application.

The core idea of the present application is to provide a touch member and a display device, the touch member comprising a first substrate, touch electrodes and a plurality of signal lines. The first substrate includes at least one bendable bending region, and a plurality of touch electrodes are disposed on at least one surface of the first substrate. At least some of the touch electrodes are separated into a plurality of disconnected touch sub-electrodes and each of the touch sub-electrodes is driven by a corresponding signal line. The disconnected touch electrodes in the bending region ensure good bending properties of the touch member and the display device at the bending region. Moreover, each of the touch sub-electrodes driven by a respective signal line ensures each of the touch sub-electrodes to be normally driven and allows normal touch control at each of the touch control positions of the display device in a bending situation.

The present application will be described in greater detail below with reference to the accompanying drawings and embodiments. It is understood that the specific embodiments described herein are merely illustrative rather than limiting the application in any sense. Noted that, in order to facilitate illustration, the drawings only show elements related to the application.

It is also noted that embodiments and the features of the embodiments of the present application may be combined in the absence of conflict. Reference will be now made to the accompanying drawings and the embodiments for a more detailed description of the present application.

Embodiment 1

A touch member 1 according to embodiment 1 will be described in detail with reference to FIG. 1.

As shown in FIG. 1, the touch member 1 is a capacitive touch member including a first substrate 100, touch electrodes and a plurality of signal lines. The first substrate 100 may be a flexible transparent substrate that is bendable and allows light to transmit through it. The first substrate 100 includes at least one bending region. In this embodiment, the first substrate 100 includes a first-directional bending region 131 extending along a first direction. In order to ensure the capacitance of the touch member 1, the bending region 131 has a width d1 in the range of 1 μm to 10 μm, such as, 1 μm, 2 μm, 3 μm, 4 μm, 5 μm, 6 μm, 7 μm, 8 μm, 9 μm or 10 μm.

The touch member 1 includes a plurality of second touch electrodes, for example, four second touch electrodes 121, 122, 123, 124 extending along a second direction in the exemplary embodiment of FIG. 1. In other embodiments, the number of the second touch electrodes may be one, two, three, five, six, seven or greater. In this embodiment, the second direction is transverse.

At least one of the second touch electrodes are separated into a plurality of disconnected second touch sub-electrodes by the first-directional bending region 131. In this embodiment, each of the second touch electrodes 121, 122, 123, 124 is strip-shaped, in which the second touch electrode 121 is separated into two disconnected second touch sub-electrodes 1211, 1212 by the first-directional bending region 131; the second touch electrode 122 is separated into two disconnected second touch sub-electrodes 1221, 1222 by the first-directional bendable bending region 131; the second touch electrode 123 is separated into two disconnected second touch sub-electrodes 1231, 1232 by the first-directional bendable bending region 131; and the second touch electrode 124 is separated into two disconnected second touch sub-electrodes 1241, 1242 by the first-directional bendable bending region 131.

In other embodiments where the touch member 1 includes two first-directional bending region, the second touch electrode 121 is separated into three disconnected second touch sub-electrodes by the two first-directional bending regions 131; the second touch electrode 122 is separated into three disconnected second touch sub-electrodes by the two first-directional bending regions 131; the second touch electrode 123 is separated into three disconnected second touch sub-electrodes by the two first-directional bending regions 131; and the second touch electrode 124 is separated into three disconnected second touch sub-electrodes by the two first-directional bending regions 131. This can be readily appreciated by those skilled in the art and thus will not be described in further detail herein.

In this embodiment, the touch member 1 further includes a plurality of first touch electrodes, for example, four first touch electrodes 111, 112, 113, 114 in the exemplary embodiment of FIG. 1, each of first touch electrodes 111, 112, 113, 114 extending along the first direction and having a strip-shape. In other embodiments, the number of the first touch electrodes of first touch electrodes 111, 112, 113, 114 may be one, two, three, five, six, seven or greater.

In this embodiment, the first-directional bending region 131 is situated between the adjacent first touch electrodes 112 and 113. In other embodiments where the touch member 1 includes two first-directional bending regions, the two first-directional bending regions may be located respectively between the first touch electrodes 111, 112 and between the first touch electrodes 112, 113; or the two first-directional bending regions may be located respectively between the first touch electrodes 112, 113 and between the first touch electrodes 113, 114; or the two first-directional bending regions may be located respectively between the first touch electrodes 111, 112 and between the first touch electrodes 113, 114. It will be appreciated that the touch member 1 may also include more than two first-directional bending regions, in which, for example, one of the first-directional bending regions is located between the first touch electrodes 111, 112; another one of the first-directional bending regions is located between the first touch electrodes 112, 113; and still another one of the first-directional bending regions is located between the first touch electrodes 113, 114; etc.

In this embodiment, each of the second touch sub-electrodes is driven by a corresponding second touch sub-electrode signal line. Specifically, the second touch sub-electrode 1211 is driven by a second touch sub-electrode signal line 1411, the second touch sub-electrode 1221 is driven by a second touch sub-electrode signal line 1421; the second touch sub-electrode 1231 is driven by a second touch sub-electrode signal line 1431; the second touch sub-electrode 1241 is driven by a second touch sub-electrode signal line 1441; the second touch sub-electrode 1212 is driven by a second touch sub-electrode signal line 1412; the second touch sub-electrode 1222 is driven by a second touch sub-electrode signal line 1422; the second touch sub-electrode 1232 is driven by a second touch sub-electrode signal line 1432; and the second touch sub-electrode 1242 is driven by a second touch sub-electrode signal line 1442. The first touch electrodes 111, 112, 113, 114 are respectively driven by the first touch electrode signal lines 151, 152, 153, 154.

The touch member 1 according to this embodiment can be used in a display device to form a touch control display device. Preferably, the display device further includes a flexible circuit board (FPC) for signal driving. All of the first touch electrode signal lines 151, 152, 153, 154 and the second touch sub-electrode signal lines 1411, 1421, 1431, 1441, 1412, 1422, 1432, 1442 are connected to the FPC.

Preferably, different signal lines connected to a same touch electrode are electrically connected via a same FPC so that the touch electrode will receive a same driving signal. Specifically, the second touch sub-electrode signal lines 1411, 1412 are electrically connected to each other via a same FPC; the second touch sub-electrode signal lines 1421, 1422 are electrically connected to each other via a same FPC; the second touch sub-electrode signal lines 1431, 1432 are electrically connected to each other via a same FPC; and the second touch sub-electrode signal lines 1441, 1442 are electrically connected to each other via a same FPC.

As shown in FIG. 1, in this embodiment, the second touch sub-electrode signal lines 1411, 1412 respectively provide the second touch sub-electrodes 1211, 1212 with a sensing signal RX1; the second touch sub-electrode signal lines 1421, 1422 respectively provide the second touch sub-electrodes 1221, 1222 with a sensing signal RX2; the second touch sub-electrode signal lines 1431, 1432 respectively provide the second touch sub-electrodes 1231, 1232 with a sensing signal RX3; and the second touch sub-electrode signal lines 1441, 1442 respectively provide the second touch sub-electrodes 1241, 1242 with a sensing signal RX4. Additionally, the first touch electrode signal lines 151, 152, 153, 154 respectively provide the first touch electrodes 111, 112, 113, 114 with driving signals TX1, TX2, TX3, TX4.

The touch member 1 is a double-layer sensing structure or a metal bridge structure. In the former case, the first touch electrodes and the second touch electrodes are fabricated in different layers, while in the latter case, they are made in the same layer. This can be readily appreciated by those skilled in the art and thus will not be described in further detail herein.

In this embodiment, the first direction is longitudinal and the second direction is transverse. In other embodiments, the first direction may be transverse and the second direction is longitudinal.

In this embodiment, the second touch electrodes are separated by the first-directional bending region 131, i.e., no portion of the second touch electrodes is included in the first-directional bending region 131, ensuring good bending properties of the touch member 1 and the display device at the first-directional bending region 131. Moreover, each of the second touch sub-electrodes driven by a respective second touch sub-electrode signal line, ensuring each of the second touch sub-electrodes to be normally driven and allowing normal touch control at each of the touch control positions of the display device in a bending situation.

Embodiment 2

Figure 2:
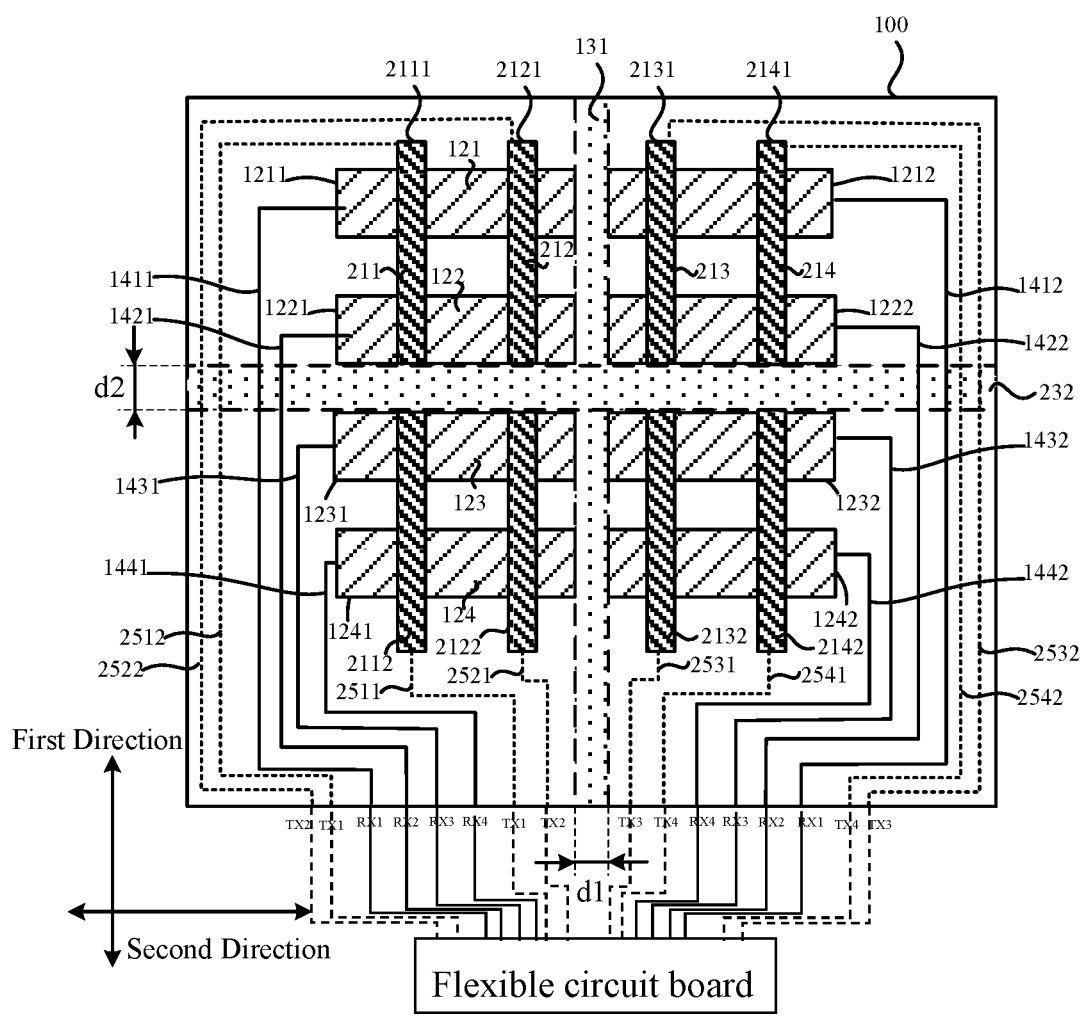
FIG. 2 is a schematic view of a touch member according to embodiment 2.

Reference is now made to FIG. 2, in which the elements common to FIG. 1 retain the same reference numerals. A touch member 2 according to embodiment 2 is essentially identical to the touch member 1 of embodiment 1 except that the first-directional bending region 131 is further connected to at least one second-directional bending region 232 extending along a second direction. In order for the touch member 1 to have proper capacitance, similar to the width d1 of the first-directional bending region 131, a width d2 of the second-directional bendable region 232 ranges from 1 µm to 10 µm, such as, 1 µm, 2 µm, 3 µm, 4 µm, 5 µm, 6 µm, 7 µm, 8 µm, 9 µm or 10 µm. However, d1 may either equal or unequal to d2.

At least one of the first touch electrodes are separated into a plurality of disconnected first touch sub-electrodes by the second-directional bending region 232. Specifically, the first touch electrode 211 is separated into two disconnected first touch sub-electrodes 2111, 2112 by the second-directional bending region 232; The first touch electrode 212 is separated into two disconnected first touch sub-electrodes 2121, 2122 by the second-directional bending region 232; the first touch electrode 213 is separated into two disconnected first touch sub-electrodes 2131, 2132 by the second-directional bending region 232; and the first touch electrode 214 is separated into two disconnected first touch sub-electrodes 2141, 2142 by the second-directional bending region 232.

In other embodiments where the touch member 1 includes two second-directional bending regions, the first touch electrode 211 is separated into three disconnected first touch sub-electrodes by the two second-directional bending regions; the first touch electrode 212 is separated into three disconnected first touch sub-electrodes by the two second-directional bending regions; the first touch electrode 213 is separated into three disconnected first touch sub-electrodes by the two second-directional bending regions; and the first touch electrode 214 is separated into three disconnected first touch sub-electrodes by the two second-directional bending regions. This can be readily appreciated by those of ordinary skilled in the art and thus will not be described in further detail herein.

In case of the touch member 2 including two or more second-directional bending regions, each of the second-directional bending regions is located between adjacent second touch electrodes and different second-directional bending regions are respectively located between different adjacent second touch electrodes. For example, one of the second-directional bending regions is situated between the second touch electrodes 121, 122, with the other between the second touch electrodes 122, 123. Alternatively, one of the second-directional bending regions is situated between the second touch electrodes 122, 123, with the other between the second touch electrodes 123, 124. Alternatively, one of the second-directional bending regions is situated between the second touch electrodes 121, 122, with the other between the second touch electrodes 123, 124. Alternatively, one of the second-directional bending regions is situated between the second touch electrodes 121, 122, another one of the second-directional bending regions between the second touch electrodes 122, 123 and the remaining one of the second-directional bending regions between the second touch electrodes 123, 124.

In this embodiment, the second-directional bendable region 232 is situated between the adjacent second touch electrodes 122, 123.

In this embodiment, each of the first touch sub-electrodes is driven by a corresponding first touch sub-electrode signal line. Specifically, the first touch sub-electrode 2111 is driven by a first touch sub-electrode drive signal line 2512; the first touch sub-electrode 2121 is driven by a first touch sub-electrode drive signal line 2522; the first touch sub-electrode 2131 is driven by a first touch sub-electrode drive signal line 2532; the first touch sub-electrode 2141 is driven by a first touch sub-electrode drive signal line 2542; the first touch sub-electrode 2112 is driven by a first touch sub-electrode drive signal line 2511; the first touch sub-electrode 2122 is driven by a first touch sub-electrode drive signal line 2521; the first touch sub-electrode 2132 is driven by a first touch sub-electrode drive signal line 2531; and the first touch sub-electrode 2142 is driven by a first touch sub-electrode drive signal line 2541.

The touch member 2 according to this embodiment can be used in a display device to form a touch control display device. Preferably, the display device further includes a flexible circuit board (FPC) for signal driving. All of the first touch electrode drive signal lines 2511, 2521, 2531, 2541, 2512, 2522, 2532, 2542 and the second touch sub-electrode drive signal lines 1411, 1421, 1431, 1441, 1412, 1422, 1432, 1442 are connected to the FPC.

Preferably, different signal lines connected to a same touch electrode are electrically connected via a same FPC so that the touch electrode will receive a same driving signal. Specifically, the first touch sub-electrode drive signal lines 2511, 2512 are electrically connected to each other via a same FPC; the first touch sub-electrode drive signal lines 2521, 2522 are electrically connected to each other via a same FPC; the first touch sub-electrode drive signal lines 2531, 2532 are electrically connected to each other via a same FPC; and the first touch sub-electrode drive signal lines 2541, 2542 are electrically connected to each other via a same FPC.

As shown in FIG. 2, in this embodiment, the second touch sub-electrode drive signal lines 1411, 1412 respectively provide the second touch sub-electrodes 1211, 1212 with a sensing signal RX1; the second touch sub-electrode drive signal lines 1421, 1422 respectively provide the second touch sub-electrodes 1221, 1222 with a sensing signal RX2; the second touch sub-electrode drive signal lines 1431, 1432 respectively provide the second touch sub-electrodes 1231, 1232 with a sensing signal RX3; and the second touch sub-electrode drive signal lines 1441, 1442 respectively provide the second touch sub-electrodes 1241, 1242 with a sensing signal RX4. In addition, the first touch sub-electrode drive signal lines 2511, 2512 respectively provide the first touch sub-electrodes 2112, 2111 with a sensing signal TX1; the first touch sub-electrode drive signal lines 2521, 2522 respectively provide the first touch sub-electrodes 2122, 2121 with a sensing signal TX2; the first touch sub-electrode drive signal lines 2531, 2532 respectively provide the first touch sub-electrodes 2132, 2131 with a sensing signal TX3; and the first touch sub-electrode drive signal lines 2541, 2542 respectively provide the first touch sub-electrodes 2142, 2141 with a sensing signal TX4.

The touch member 2 according to this embodiment is a double-layer sensing structure or a metal bridge structure. In the former case, the first touch electrodes and the second touch electrodes are fabricated in different layers, while in the latter case, they are made in the same layer. This can be readily appreciated by those skilled in the art and thus will not be described in further detail herein.

In this embodiment, the second touch electrodes are separated by the first-directional bending region 131 and the first touch electrodes is separated by the second-directional bending region 232, ensuring good bending properties of the touch member 2 and the display device in the first-directional bending region 131 and in the second-directional bending region 232. Moreover, each of the first touch sub-electrodes is separated by a respective first touch sub-electrode drive signal line and each of the second touch sub-electrodes is separated by a respective second touch sub-electrode drive signal line, ensuring each of the second touch sub-electrodes and the first touch sub-electrodes to be normally driven and allowing normal touch control at each of the touch control positions of the display device in a bending situation.

Embodiment 3

Figure 3:
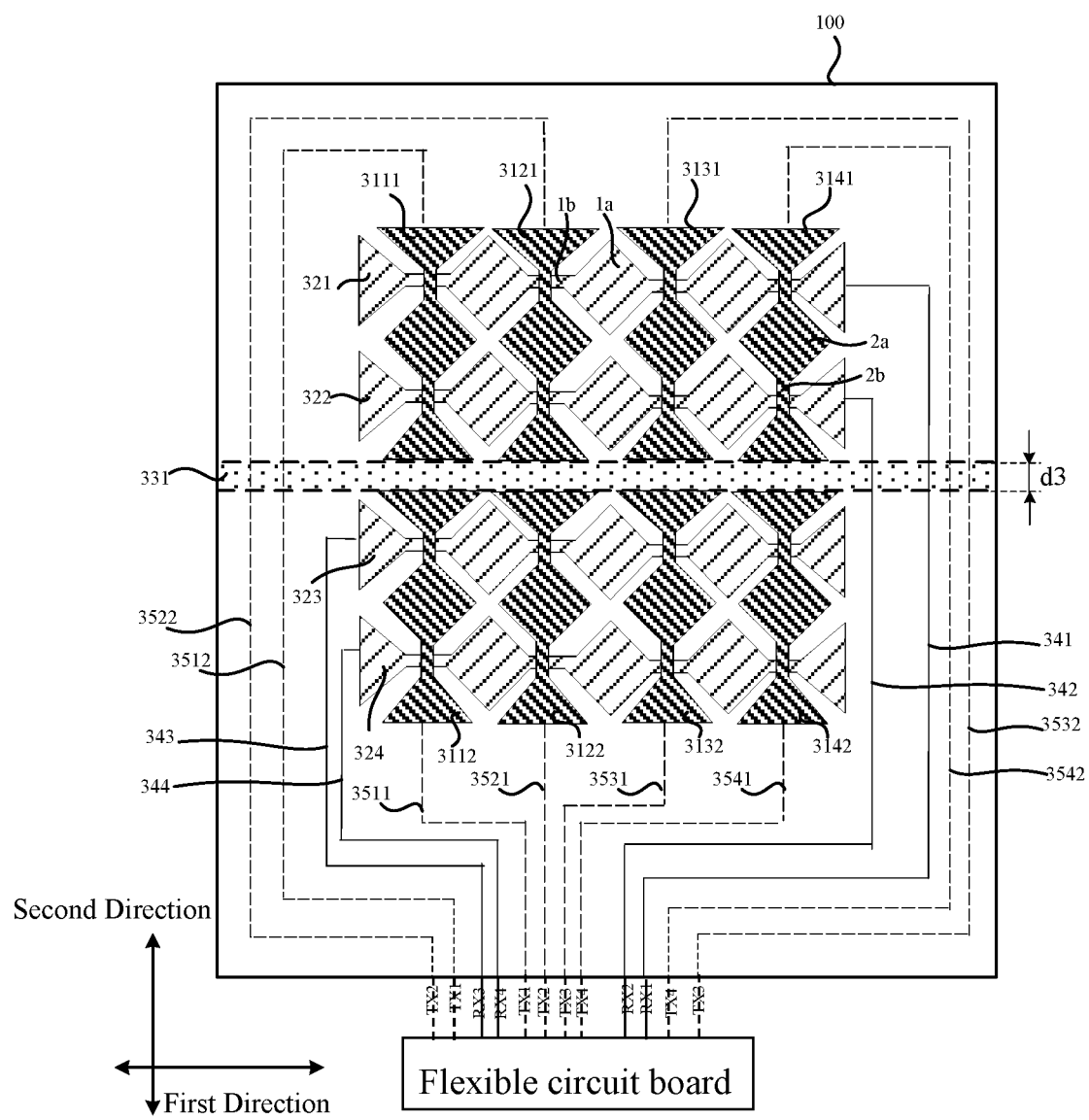
FIG. 3 is a schematic view of a touch member according to embodiment 3.

Reference is now made to FIG. 3, in which the elements common to FIG. 1 retain the same reference numerals. A touch member 3 according to embodiment 3 is essentially identical to the touch member 1 of embodiment 1 except that the first direction is transverse and the second direction is longitudinal. Each of the first touch electrodes includes a plurality of first rhombic electrodes 1a and a first connection line 1b, and the plurality of first rhombic electrodes 1a along the first direction are electrically connected by the first connection line 1b. Each of the second touch electrodes includes a plurality of second rhombic electrodes 2a and a second connection line 2b, and the plurality of second rhombic electrodes 2a along the second direction are electrically connected by the second connection line 2b.

Specifically, the first substrate 100 includes a first-directional bending region 331 extending along the first direction. In order for the touch member 3 to have proper capacitance, the bending region 331 has a width d3 in the range of 1 µm to 10 µm, such as, 1 µm, 2 µm, 3 µm, 4 µm, 5 µm, 6 µm, 7 µm, 8 µm, 9 µm or 10 µm.

The touch member 3 includes a plurality of second touch electrodes, for example, four second touch electrodes extending along the second direction in the exemplary embodiment of FIG. 3. In other embodiments, the number of the second touch electrodes may also be one, two, three, five, six, seven or greater.

At least one of the second touch electrodes are separated into a plurality of disconnected second touch sub-electrodes by the first-directional bending region 331. In this embodiment, a first one of the second touch electrodes is separated into two disconnected second touch sub-electrodes 3111, 3112 by the first-directional bending region 331; a second one of the second touch electrodes is separated into two disconnected second touch sub-electrodes 3121, 3122 by the first-directional bending region 331; a third one of the second touch electrodes is separated into two disconnected second touch sub-electrodes 3131, 3132 by the first-directional bending region 331; and a fourth one of the second touch electrodes is separated into two disconnected second touch sub-electrodes 3141, 3142 by the first-directional bending region 331.

In other embodiments where the touch member 3 includes two first-directional bending regions, a first one of the second touch electrodes is separated into three disconnected second touch sub-electrodes by the two first-directional bending regions; a second one of the second touch electrodes is separated into three disconnected second touch sub-electrodes by the two first-directional bending regions; a third one of the second touch electrodes is separated into three disconnected second touch sub-electrodes by the two first-directional bending regions; and a fourth one of the second touch electrodes is separated into three disconnected second touch sub-electrodes by the two first-directional bending regions. This can be readily appreciated by those of ordinary skilled in the art and thus will not be described in further detail herein.

In this embodiment, the touch member 3 further includes a plurality of first touch electrodes, for example, four first touch electrodes 321, 322, 323, 324 in the exemplary embodiment of FIG. 3, each extending along the first direction. In other embodiments, the number of the first touch electrodes may also be one, two, three, five, six, seven or greater.

In case of the touch member 3 including two or more first-directional bending regions, each of the first-directional bending regions is situated between adjacent first touch electrodes and different first-directional bending regions are respectively located between different adjacent first touch electrodes. For example, one of the first-directional bending regions is situated between the first touch electrodes 321, 322, with the other between the first touch electrodes 322, 323. Alternatively, one of the first-directional bending regions is situated between the first touch electrodes 322, 323, with the other between the first touch electrodes 323, 324. Alternatively, one of the first-directional bending regions is situated between the first touch electrodes 321, 322, with the other between the first touch electrodes 323, 324. Alternatively, one of the first-directional bending regions is situated between the first touch electrodes 321, 322, another one of the first-directional bending regions between the first touch electrodes 322, 323 and the remaining one of the first-directional bending regions between the first touch electrodes 323, 324.

In this embodiment, the first-directional bending region 331 is situated between the adjacent first touch electrodes 322, 323.

In this embodiment, each of the second touch sub-electrodes is driven by a corresponding first touch sub-electrode drive signal line. Specifically, the second touch sub-electrode 3111 is driven by a second touch sub-electrode drive signal line 3512, the second touch sub-electrode 3112 is driven by a second touch sub-electrode drive signal line 3511, the second touch sub-electrode 3121 is driven by a second touch sub-electrode drive signal line 3522, the second touch sub-electrode 3122 is driven by a second touch sub-electrode drive signal line 3521, the second touch sub-electrode 3131 is driven by a second touch sub-electrode drive signal line 3532, the second touch sub-electrode 3132 is driven by a second touch sub-electrode drive signal line 3531, the second touch sub-electrode 3141 is driven by a second touch sub-electrode drive signal line 3542 and the second touch sub-electrodes 3142 is driven by a second touch sub-electrode drive signal line 3541. The first touch electrodes 321, 322, 323, 324 are driven by respective first touch electrode drive signal lines 341, 342, 343, 344.

The touch member 3 according to this embodiment can be used in a display device to form a touch control display device. Preferably, the display device further includes a flexible circuit board (FPC) for signal driving. All of the first touch electrode drive signal lines 341, 342, 343, 344 and the second touch sub-electrode drive signal lines 3511, 3521, 3531, 3541, 3512, 3522, 3532, 3542 are connected to the FPC.

Preferably, different signal lines connected to a same touch electrode are electrically connected via the same FPC so that the touch electrode will receive a same driving signal. Specifically, the second touch sub-electrode drive signal lines 3511, 3512 are electrically connected to each other via a same FPC; the second touch sub-electrode drive signal lines 3521, 3522 are electrically connected to each other via a same FPC; the second touch sub-electrode drive signal lines 3531, 3532 are electrically connected to each other via a same FPC; and the second touch sub-electrode drive signal lines 3541, 3542 are electrically connected to each other via a same FPC.

As shown in FIG. 3, in this embodiment, the second touch sub-electrode drive signal lines 3512, 3511 respectively provide the second touch sub-electrodes 3111, 3112 with a sensing signal TX1, the second touch sub-electrode drive signal lines 3522, 3521 respectively provide the second touch sub-electrodes 3121, 3122 with a sensing signal TX2, the second touch sub-electrode drive signal lines 3532, 3531 respectively provide the second touch sub-electrodes 3131, 3132 with a sensing signal TX3, and the second touch sub-electrode drive signal lines 3542, 3541 respectively provide the second touch sub-electrodes 3141, 3142 with a sensing signal TX4. Additionally, the first touch electrode drive signal lines 341, 342, 343, 344 respectively provide the first touch electrodes 321, 322, 323, 324 with driving signals RX1, RX2, RX3, RX4.

The touch member 3 is a double-layer sensing structure or a metal bridge structure. In the former case, the first touch electrodes and the second touch electrodes are fabricated in different layers, while in the latter case, they are made in the same layer. This can be readily appreciated by those of ordinary skilled in the art and thus will not be described in further detail herein.

In this embodiment, the first direction is transverse and the second direction is longitudinal. In other embodiments, the first direction may be longitudinal and the second direction is transverse.

In this embodiment, the second touch electrodes are separated by the first-directional bending region 331, ensuring good bending properties of the touch member 3 and the display device at the first-directional bendable region 331. Moreover, each of the second touch sub-electrodes is separated by a respective second touch sub-electrode drive signal line, ensuring each of the second touch sub-electrodes to be normally driven and allowing normal touch control at each of the touch control positions of the display device in a bending situation.

It is apparent that those skilled in the art can make various modifications and variations to the present application without departing from the spirit and scope thereof. Accordingly, the application is intended to embrace all such modifications and variations if they fall within the scope of the appended claims and equivalents thereof.

What is claimed is:

1. A touch member, comprising:
   a first substrate, comprising at least one bendable bending region; and
   a plurality of strip-shaped touch electrodes disposed on at least one surface of the first substrate;
   wherein at least some of the plurality of strip-shaped touch electrodes are separated into a plurality of disconnected strip-shaped touch sub-electrodes by the bending region, and each of the strip-shaped touch sub-electrodes is driven by one respective signal line,
   wherein the plurality of strip-shaped touch electrodes comprise a plurality of first strip-shaped touch electrodes that are spaced at a certain distance and arranged parallel to a first direction and a plurality of second strip-shaped touch electrodes that are spaced at a certain distance and arranged parallel to a second direction, wherein the plurality of first strip-shaped touch electrodes and the plurality of second strip-shaped touch electrodes are located in different layers, wherein the at least one bendable bending region is strip-shaped extending across the first direction or the second direction, wherein the disconnected strip-shaped touch sub-electrodes from a same touch electrode are connected to a same flexible circuit board to receive a same driving signal, wherein different touch sub-electrode drive signal lines respectively provide the disconnected strip-shaped touch sub-electrodes with a same sensing signal, wherein the bending region comprises n first-directional bending regions extending along the first direction, at least one of the second strip-shaped touch electrodes are separated into (n+1) disconnected second strip-shaped touch sub-electrodes by the first-directional bending regions, each of the second strip-shaped touch sub-electrodes is driven by a second strip-shaped touch sub-electrode signal line, and n is a positive integer, and wherein the bending region further comprises m second-directional bending regions extending along the second direction, at least one of the first strip-shaped touch electrodes are separated into (m+1) disconnected first strip-shaped touch sub-electrodes by the second-directional bending regions, each of the first strip-shaped touch sub-electrodes is driven by a first strip-shaped touch sub-electrode signal line, and m is a positive integer.

2. The touch member of claim 1, wherein each of the first-directional bending regions is located between two adjacent first touch electrodes, and different first-directional bending regions are respectively located between different two adjacent first touch electrodes.

3. The touch member of claim 1, wherein each of the second-directional bending regions is located between two adjacent second touch electrodes, and different second-directional bending regions are respectively located between different two adjacent second touch electrodes.

4. The touch member of claim 1, wherein the bending region has a width of 1 μm to 10 μm.

5. A display device, comprising the touch member as defined in claim 1.

6. The display device of claim 5, further comprising a flexible circuit board, and different signal lines connected to a same touch electrode are electrically connected by the flexible circuit board.

7. The display device of claim 6, wherein the flexible circuit board provides a same sensing signal to each of the touch sub-electrodes of the same touch electrode.

8. The display device of claim 1, wherein the first touch sub-electrode signal lines and the second touch sub-electrode signal lines are substantially parallel with each other at corresponding sections.

* * * * *